United States Patent [19]

Dierks et al.

[11] 4,195,110

[45] Mar. 25, 1980

[54] GLASS-REINFORCED COMPOSITE GYPSUM BOARD

[75] Inventors: Robert P. Dierks; Robert J. Rillie, both of Des Plaines, Ill.

[73] Assignee: United States Gypsum Company, Chicago, Ill.

[21] Appl. No.: 666,539

[22] Filed: Mar. 15, 1976

Related U.S. Application Data

[63] Continuation of Ser. No. 592,960, Jul. 3, 1975, abandoned, which is a continuation of Ser. No. 415,038, Nov. 12, 1973, abandoned.

[51] Int. Cl.$^2$ ................. B32B 7/02; B32B 13/02; B32B 13/14
[52] U.S. Cl. ..................... 428/218; 428/228; 428/251; 428/246; 428/285; 156/42
[58] Field of Search ............. 428/298, 218, 228, 285, 428/246, 251; 156/39, 42; 52/612, 622

[56] References Cited

U.S. PATENT DOCUMENTS 3,305,375  2/1967  Jakacki ..................... 106/110

FOREIGN PATENT DOCUMENTS

| 227461 | 6/1958 | Australia ........................ 52/464 |
| 878837 | 6/1953 | Fed. Rep. of Germany ............ 52/612 |
| 878917 | 6/1953 | Fed. Rep. of Germany ............ 52/612 |
| 1509853 | 4/1970 | Fed. Rep. of Germany ............ 156/42 |

OTHER PUBLICATIONS

Majumdar, "Glass Fiber Reinforced Cement & Gypsum Products," Proc. Royal Soc. (London) pp. 69–73, Oct. 1970.

Sweets Architectural Cat. File (1973) pp. E3, 4, 5, 9, 25, 26, 27, 28 and 29.

Primary Examiner—George F. Lesmes
Assistant Examiner—Alexander S. Thomas
Attorney, Agent, or Firm—Samuel Kurlandsky; Robert H. Robinson; Kenneth E. Roberts

[57] ABSTRACT

A reinforced gypsum board having glass fibers concentrated in the portions of the rehydrated stucco immediately below the surfaces of the board, these portions being further defined by a density that is substantially greater than that of the interior portion of the board.

18 Claims, 1 Drawing Figure

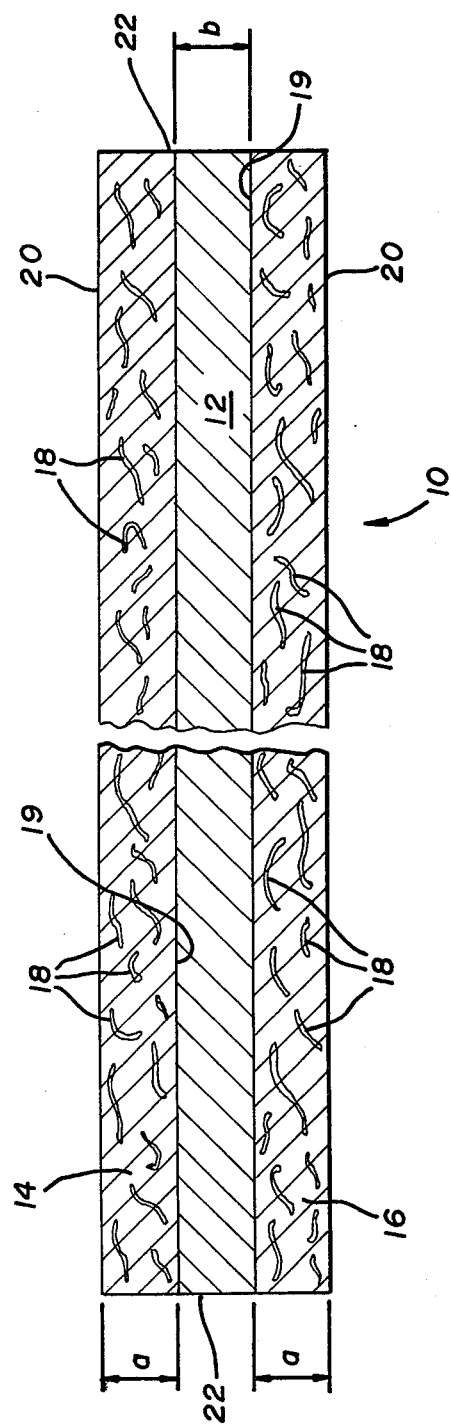

GLASS-REINFORCED COMPOSITE GYPSUM BOARD

This is a continuation of application Ser. No. 592,960, filed July 3, 1975, now abandoned, which itself is a continuation application of U.S. Application Ser. No. 415,038, filed on Nov. 12, 1973, now abandoned.

BACKGROUND OF THE INVENTION

Wall panels or wallboards made from rehydrated stucco conventionally comprise a gypsum core of uniform density sandwiched between two paper cover sheets. Such panels can be mass produced and erected so inexpensively that they have largely replaced prior building techniques using wood panels or plaster. As the usage of such wallboard has expanded, however, specialty used such as walls in high-rise office buildings and apartments have placed a premium on certain properties. Specifically, shaft walls used for example as elevator shafts, air return shafts, and stairwells are subject in some instances to very strict fire regulations. Thus there is a trend in municipal fire codes towards requiring a 0-0-0 fire rating for the exposed surface of elevator shafts. This rating means zero flame spread, zero smoke, and zero toxic gas generation. It has not been possible to achieve such ratings as long as paper-covered wallboard is used, due to the combustibility or at least the smoke-generation capability, of the paper cover sheets. Such paper cover sheets are further troublesome in that they appreciably delay the drying time of the board during its manufacture.

A further problem characteristic of particularly some elevator shafts is that wind loading causes constant flexing of the wallboard. Thus, when used in such walls, the wallboard must have good flexural strength—a feature not present in rehydrated stucco alone due to the low modulus of rupture of the gypsum.

Some presently manufactured wallboard does include various ingredients which give fire resistance to the board. For example, glass fibers on the order of one-half inch long have been incorporated throughout the core of paper-covered gypsum wallboard used to line elevator shaft walls, on a weight percent basis of about 0.25% of the weight of the board. However, such fibers are not long enough to contribute significantly to the flexural strength of the board, as the concentration is insufficient, and at that length, the fibers' tensile strength is greater than their pull-out strength.

Still another approach is illustrated in New Zealand Pat. No. 155,679, which teaches a gypsum panel constructed with glass fibers of various lengths, dispersed generally throughout the rehydrated stucco. Such a construction has eliminated the need for a paper cover sheet. However, the process of making such panels is difficult, time-consuming, and involves the use of a considerable amount of glass fibers, inasmuch as they are distributed more or less uniformly throughout the board or panel.

SUMMARY OF THE INVENTION

The invention relates to a gypsum board having enhanced strength and a construction which eliminates cellulosic cover sheets, whereby the board may be used in environments requiring strict fire protection and good flexural strength. More specifically, there is provided a reinforced gypsum board having two opposite face surfaces terminating in edge surfaces, the board comprising rehydrated stucco and glass fibers, the fibers being selectively dispersed within the stucco so as to define reinforced stucco portions under said face surfaces in which said fibers are concentrated, and a core stucco portion disposed between said reinforced portions which is essentially free of said fibers, said reinforced portions having a density of stucco which is substantially greater than that of the stucco of said core portion, whereby said board has enhanced flexural strength.

Accordingly, it is an object of the invention to provide an improved gypsum board which has increased flexural strength without the need for the incorporation of combustible or smoke-producing elements.

It is a related object of the invention to provide such a board in an inexpensive manner, which minimizes the cost of materials incorporated therein.

Another object of the invention is to provide such a board the structure of which reduces the processing time, whereby the costs of the board are further reduced.

Other objects and advantages will become apparent upon reference to the following brief description of the drawings and the description of the preferred embodiments.

BRIEF DESCRIPTION OF THE DRAWING

The FIGURE is a partially schematic, fragmentary transverse sectional view of a board constructed in accordance with the invention.

DESCRIPTION OF THE PREFERRED EMBODIMENTS

The board hereinafter described is particularly useful in shaft wall construction, such as elevator shafts. However, it can also be used in any wall or ceiling construction, particularly where an exposed smokeless surface is desired on at least one side of the wall. The exposed stucco surface may be utilized to give the appearance of a plastered surface.

The FIGURE illustrates a reinforced gypsum board 10 made from rehydrated stucco, having a core portion of layer 12, and outer reinforced portions or layers 14 and 16 between which the core portion is sandwiched. In accordance with one aspect of the invention, the core portion 12 has a relatively lower density and is essentially free of glass fibers, while the reinforced portions 14 and 16 have glass fibers 18 dispersed throughout, and a relatively higher density. The value of the density is generally constant throughout each layer.

Preferably, each layer is self-bonded side-by-side along the inner faces 19 of the layers to the next adjacent one by inter-crystalline growth. This is best achieved by casting each layer on top of the lower one immediately after the lower is cast. In that event, it will be appreciated that the boundary between the adjacent layers 14, 12 and 16 is not a sharply defined plane, but rather an irregular, graded interface. If a sharply defined interface is required, a conventional adhesive may be used, to join three layers separately cast and dried.

In accordance with another aspect of the invention, the opposite surfaces 20 of the layers 14 and 16 are left exposed, so as to define the face surfaces of the board. The result is a surface 20 which will not smoke when exposed to the heat of a fire. A further advantage is that there is no cover sheet to hinder the evaporation of excess water in the drying kiln. The processing time is thus reduced.

The board 10 also terminates in four edge surfaces 22, as is conventional, which may also be left exposed. The surfaces 22 preferably coincide with the edge surfaces of the core portion 12, so that the core portion has the same length and width as the total board.

The density of portion 12 may vary from about 35 pcf (pounds per cubic foot) to about 65 pcf. The lower densities are preferably achieved by the incorporation of considerable amounts of foam by conventional processes. Portions 14 and 16 have a substantially higher density than that of portion 12, and this higher density may vary from between about 40 pcf to about 75 pcf. These density ranges may be extended in both directions for specialty products. Such products can be made in accordance with the instant invention by using formulated gypsum cements which incorporate alpha-type calcium sulfate hemihydrate, a set modifier such as a proteinaceous retarder, and a water reducing agent such as gum arabic. For instance, by using "SUPER X HYDROSTONE" gypsum cement sold by the United States Gypsum Company, the density of portions 14 and 16 can be as high as about 110 pcf. Foaming this material can produce densities as low as about 20 pcf for portion 12.

Glass fibers 18 may be in the form of rovings, a continuous strand mat, or combinations of chopped fiber and continuous roving or mat, or may be the various types disclosed in the aforesaid New Zealand patent. In any event, the fibers should be randomly disposed or woven together and be at least about one-half inch in length. The amount of glass fibers in each layer should be between about 2 and 10% of the dry weight of the respective portion or layer, if the fibers are in chopped form. Less than that, the fibers are insufficient to contribute to the flexural strength. More than 10% is exceedingly difficult to work into the stucco slurry. However, when reinforcement is in the form of continuous roving or mat, the ratio of effective fiber surface area to its weight is less, hence more may be used.

The diameter of the glass fibers is not important, and usually varies from about 0.00015 inches to about 0.00050 inches.

Regardless of the total thickness of the board, each layer must have a minimum thickness of ⅛ of an inch. Preferably, the outer layers 14 and 16 are kept at the minimum thickness because of their increased density and incorporation of glass fibers. By maximizing the thickness of core portion 12, a savings in material is achieved.

As an example for illustrative purposes only, a one-inch board was prepared pursuant to the above description, and in accordance with the following Table No. 1:

Table No. 1

| Layer | Thickness ("a" or "b") | Density (pcf) | % Glass Fibers | Average Fiber Length |
|---|---|---|---|---|
| 12 | about 3/4 inch | 44.03 | 0 | — |
| 14 | about 1/8 inch | 64.37 | 6.7 | about 9 inches |
| 16 | about 1/8 inch | 64.37 | 6.7 | about 9 inches |

The glass was "825 DA" continuous strands obtained from Owens-Corning, cut into 9" strands which were randomly woven together. The diameter of filaments in these strands was between about 0.00036 and about 0.00051 inches. The stucco was prepared in a conventional manner. The board was prepared by casting layer 16 onto a form comprising a stainless steel plate and aluminum bars defining the edges of the board. A conventional parting or release compound was placed on the form. Prior to the setting of layer 16, layer 12 was cast thereover, followed immediately by layer 14. The overall density of the composite board so produced as about 51.9 pcf.

This board was dried to a constant weight at 100° F., after which is was cut into 6 inch by 12 inch slabs. These slabs were tested on a Tinius Olsen Testing Machine for flexural strength. Except for the drying preparation noted above, and the application of the load at the midpoint of a 10 inch span, ASTM C 473 standards were followed. Two conventional paper coverd, one inch gypsum boards sold by the United States Gypsum Company as "Shaft Wall Liner", having a density stated below, were similarly prepared and tested as controls. In the case of the controls, the direction of the span of the slab was that having the maximum strength. The results are in Table No. 2.

Table No. 2

| Country | Flexural Strength | Deflection at Rupture | Board Density |
|---|---|---|---|
| 3 layer board of the invention | 417 lbs. | 0.107 inches | 51.9 |
| Control No. 1 | 210 | 0.097 | 49.8 |
| Control No. 2 | 220 | 0.095 | 50.6 |

Thus it was found that the invention resulted in a considerable increase in flexural strength. Due to the central plane of symmetry in the board, this strength is the same regardless of the face from which it is measured.

The aforesaid board can be prepared on a board line by the use of three different mixers spaced along a steel or plastic belt having side rails. A conventional parting compound will insure release of the board from the belt. Strippable plastic sheets might also be used to control formation during set.

Although the invention has been described in connection with certain preferred embodiments, it is not intended that it be limited thereto. For example, paper sheets could be incorporated at the interface of layers 14 and 16 with layer 12, although this could adversely affect the smokeless or incombustible nature of subsurfaces 19 after prolonged exposure to fire. Glass fiber sheets, of course, would not have this disadvantage. Thus, it is intended that the invention cover all alternate arrangements, equivalents, and embodiments as may be included within the scope of the following claims.

What is claimed is:

1. A reinforced gypsum board having two opposite exposed gypsum face surfaces terminating in edge surfaces, the board consisting essentially of
    rehydrated stucco and randomly disposed glass fibers and being free of organic fibers,
    the fibers being selectively dispersed within the stucco so as to define, under said face surfaces, reinforced stucco portions in which said fibers are uniformly concentrated, and a core stucco portion disposed between said reinforced portions which is essentially free of said fibers,
    said reinforced portions having a density of stucco which is substantially greater than that of the stucco of said core portion,
    whereby said board has enhanced flexural strength.

2. The board as defined in claim 1, wherein each of said portions is a separate layer each with a generally constant density.

3. The board as defined in claim 1, wherein said fibers are present in each of said reinforced portions in an amount of at least about 2% of the weight of said each portion and have an average length of at least 0.5 inches.

4. The board as defined in claim 3, wherein said glass fibers are rovings randomly woven together, the rovings having an average length of about nine inches.

5. The board as defined in claim 1, wherein said reinforced portions are left exposed so that the exposed surfaces thereof define the face surfaces of the board.

6. The board as defined in claim 1, wherein the density of each of said reinforced portions is between about 40 and about 110 pounds per cubic foot.

7. The board as defined in claim 1, wherein said core portion has a density between about 20 and about 65 pounds per cubic foot.

8. The board as defined in claim 1, wherein said fibers have a diameter between about 0.00015 inches and about 0.00050 inches.

9. The board as defined in claim 1, wherein said stucco is rehydrated alpha-type calcium sulfate hemihydrate.

10. A reinforced composite gypsum board, consisting essentially of
a core of rehydrated stucco essentially free of glass fibers, said core having two opposite faces,
and two layers of rehydrated stucco being free of organic fibers and having randomly disposed glass fibers dispersed generally uniformly throughout and having a rehydrated stucco density substantially greater than that of said core, each of the layers being bonded to a respectively opposite face of said stucco core and having outer exposed gypsum surfaces,
whereby said board has enhanced flexural strength.

11. The board as defined in claim 10, wherein said fibers are present in each of said layers in an amount of at least about 2% of the weight of each said layers and have an average length of at least about 0.5 inches.

12. The board as defined in claim 10, wherein said glass fibers are rovings randomly woven together, the rovings having an average length of about nine inches.

13. The board as defined in claim 10, wherein said layers are left exposed so that the exposed surfaces thereof define the face surfaces of the board.

14. The board as defined in claim 10, wherein the density of each of said layers is between about 40 and about 110 pounds per cubic foot.

15. The board as defined in claim 10, wherein said core has a density between about 20 and about 65 pounds per cubic foot.

16. The board as defined in claim 10, wherein the board has two faces terminating in edge surfaces, said core faces being generally coextensive in length and width with said board faces.

17. The board as defined in claim 10, wherein said fibers have a diameter between about 0.00015 inches and about 0.00050 inches.

18. The board as defined in claim 10, wherein said stucco is rehydrated alpha-type calcium sulfate hemihydrate.

* * * * *